Jan. 26, 1954  W. R. BELL ET AL  2,667,249
WINDSHIELD CLEANER DECLUTCHING MECHANISM
Filed April 22, 1950  6 Sheets-Sheet 1
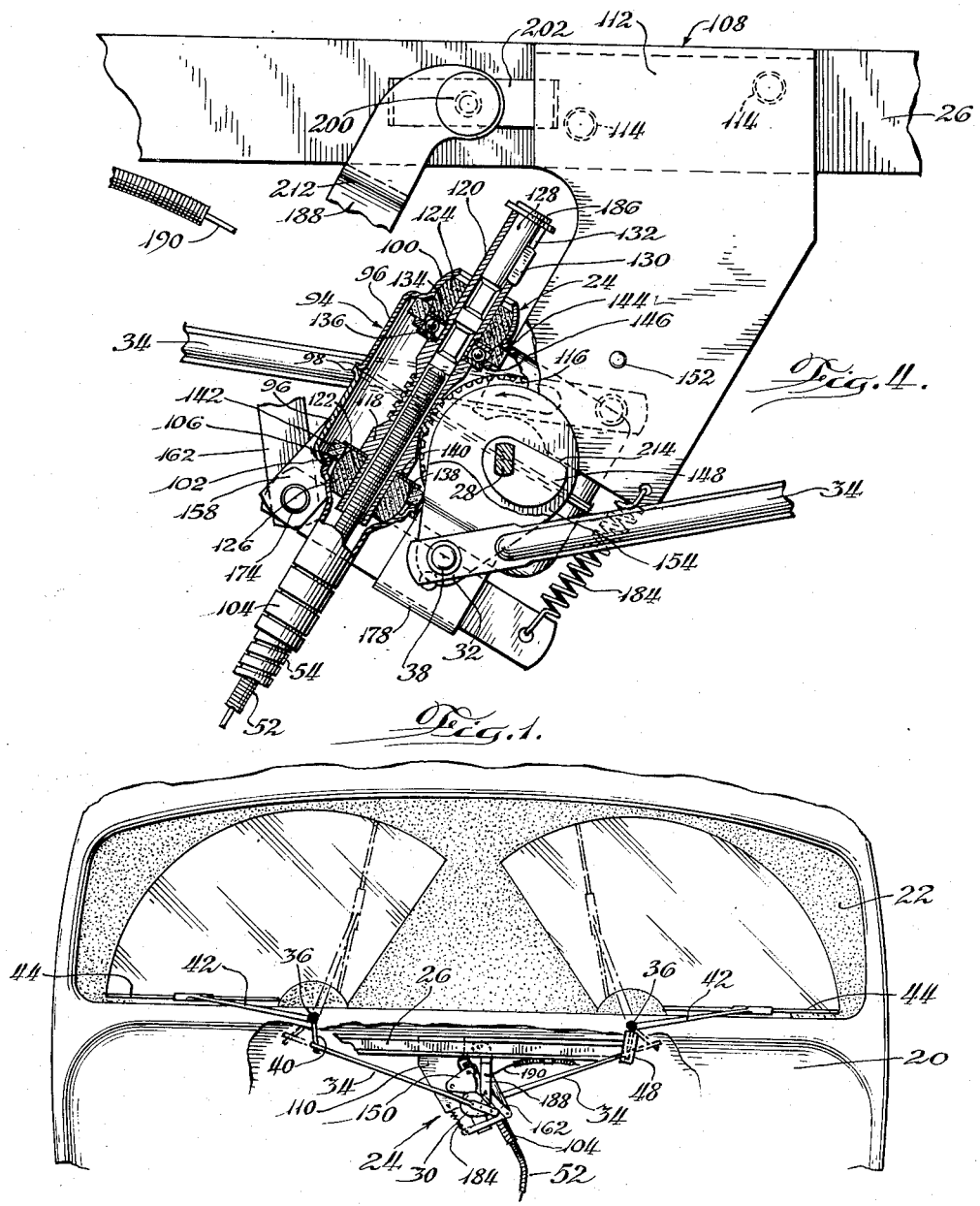
Inventors:
William R. Bell
Edwin C. McRae
By Hinkle, Horton, Ahlberg, Hansmann & Wupper
Attorneys.

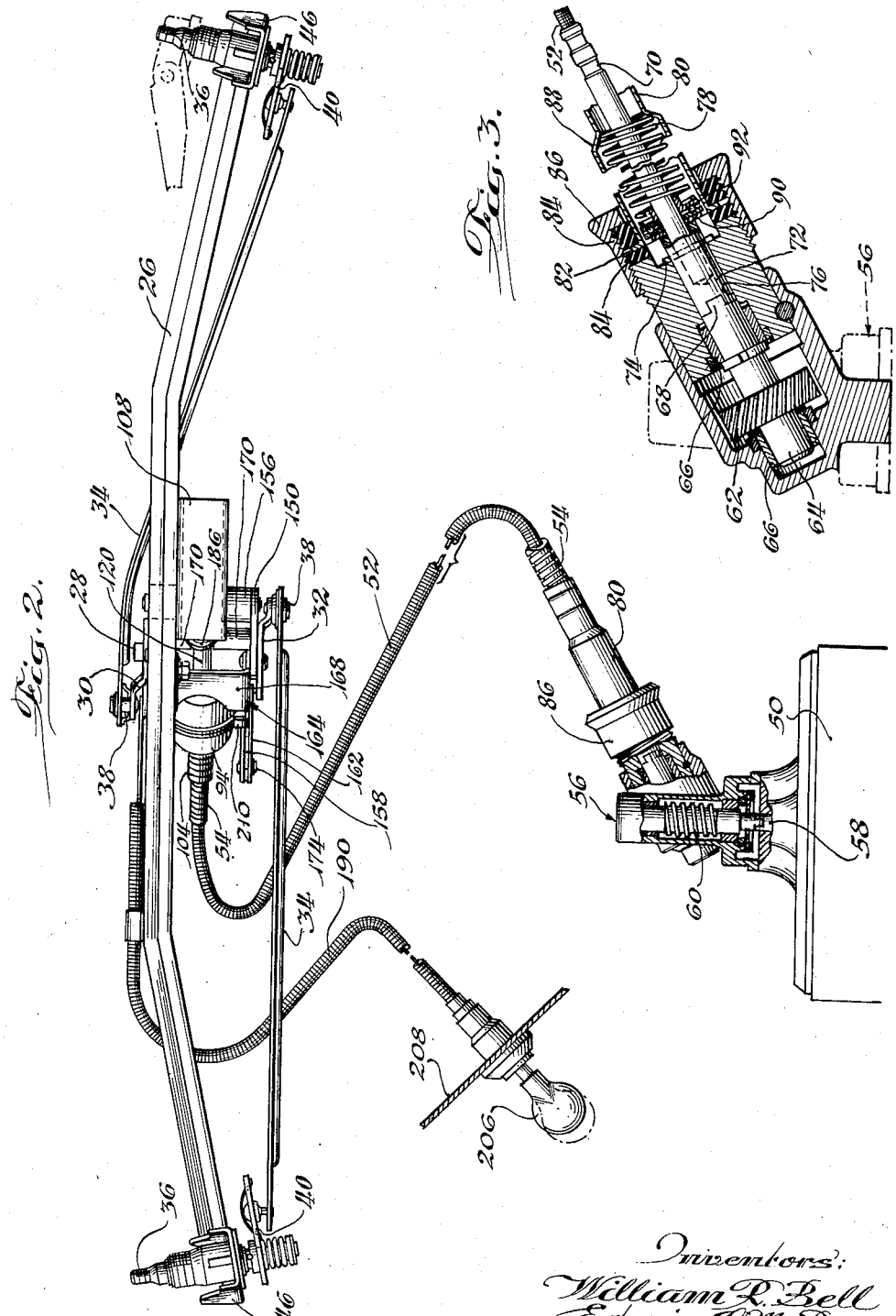

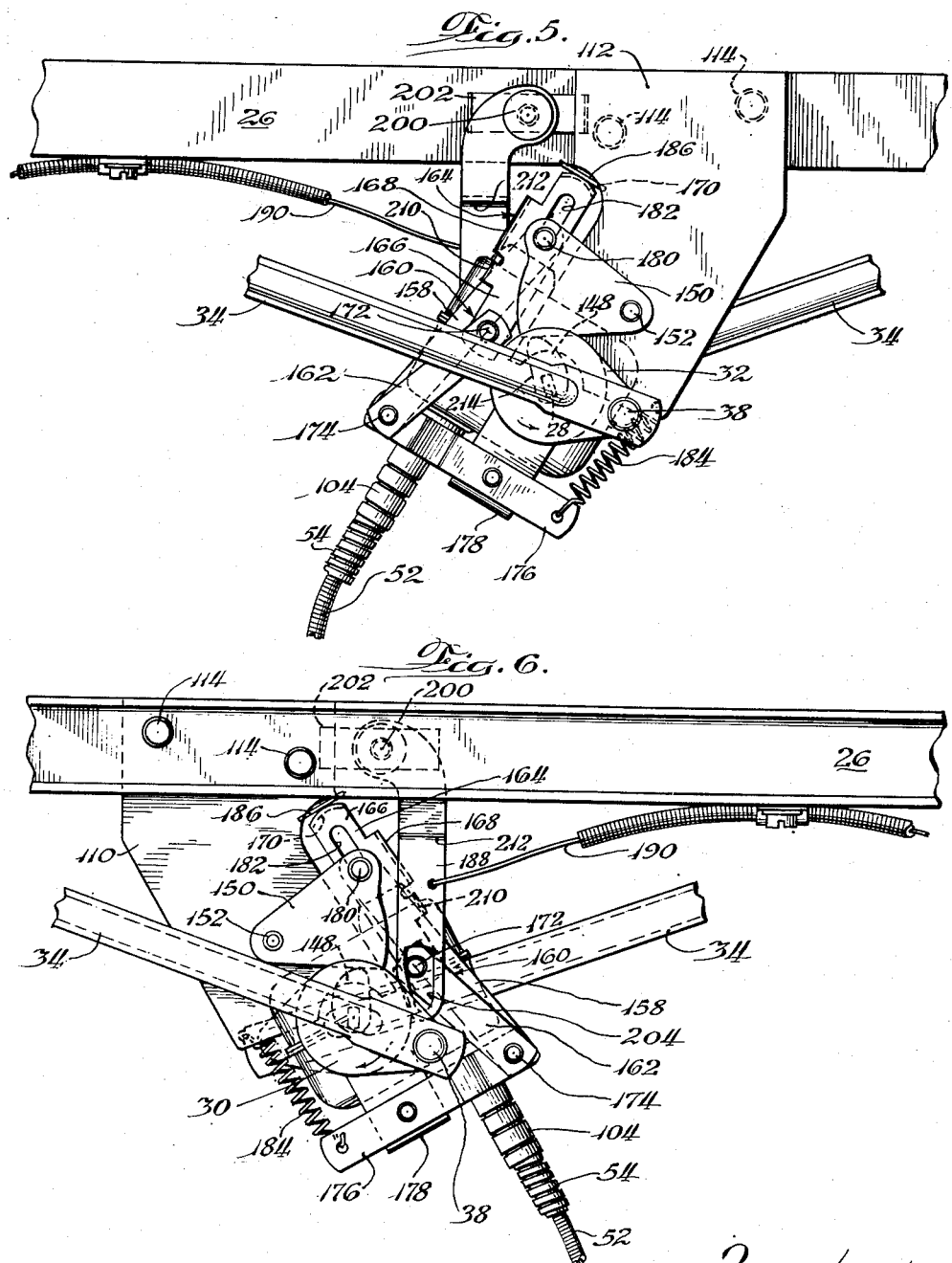

Jan. 26, 1954  W. R. BELL ET AL  2,667,249
WINDSHIELD CLEANER DECLUTCHING MECHANISM
Filed April 22, 1950  6 Sheets-Sheet 4

Inventors:
William R. Bell
Edwin C. McRae
By Hindele, Horton, Ahlberg, Hansmann & Kupper
Attorneys.

Jan. 26, 1954  W. R. BELL ET AL  2,667,249
WINDSHIELD CLEANER DECLUTCHING MECHANISM
Filed April 22, 1950  6 Sheets-Sheet 5

Inventors:
William R. Bell
Edwin C. McRae
By Hinkle, Horton, Ahlberg, Hausmann & Wupper
Attorneys.

Jan. 26, 1954  W. R. BELL ET AL  2,667,249
WINDSHIELD CLEANER DECLUTCHING MECHANISM
Filed April 22, 1950  6 Sheets-Sheet 6
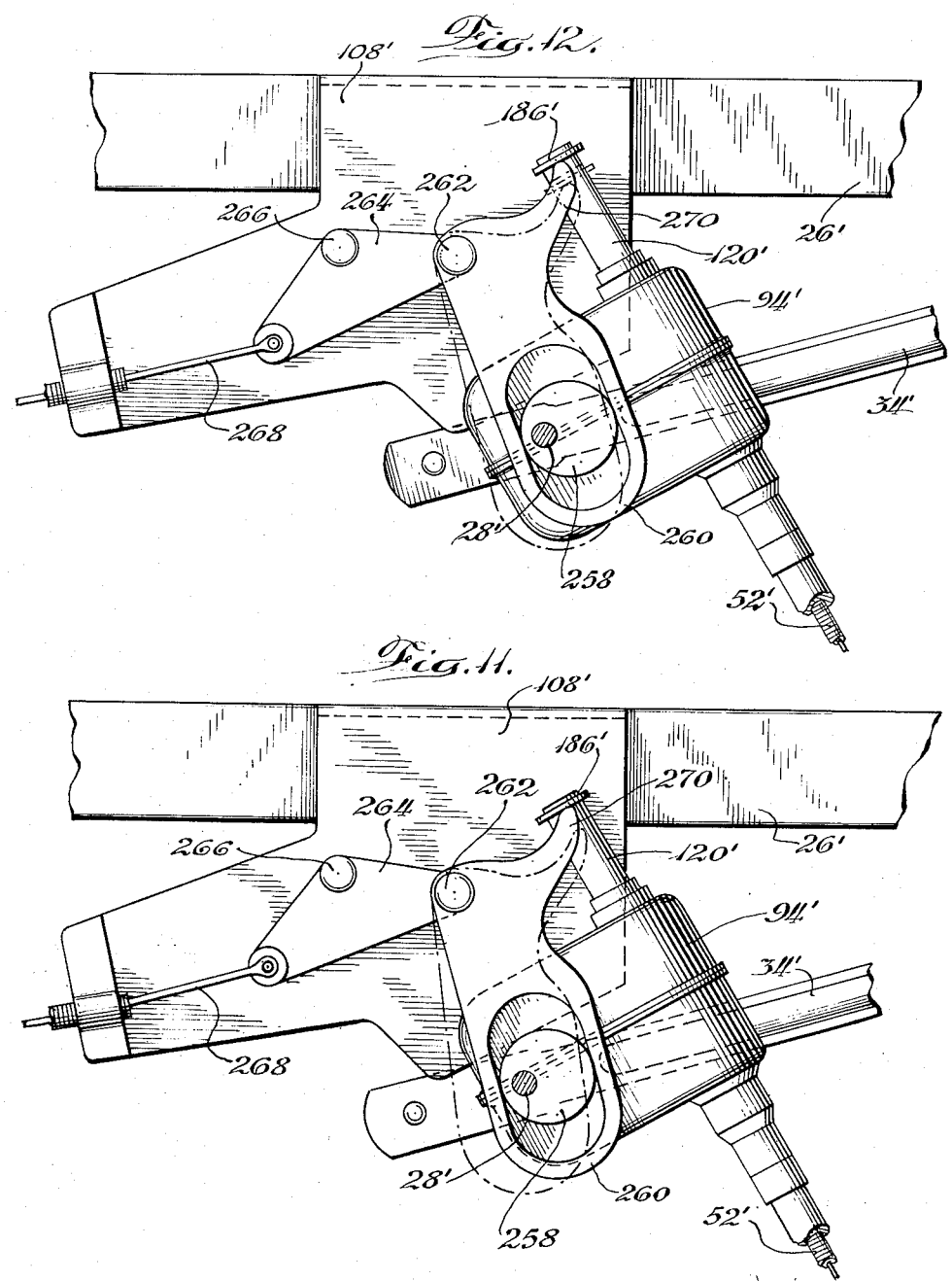

Patented Jan. 26, 1954

2,667,249

UNITED STATES PATENT OFFICE 2,667,249

WINDSHIELD CLEANER DECLUTCHING MECHANISM

William R. Bell, Skokie, Ill., and Edwin C. McRae, Dearborn, Mich.

Application April 22, 1950, Serial No. 157,488

4 Claims. (Cl. 192—33)

1

The present invention relates to windshield cleaners and more particularly to an improved means for controlling starting and stopping of a mechanically operated windshield cleaner and parking of the wiper blades of the cleaner.

An object of the invention is to provide a windshield cleaner having improved control mechanism for starting and stopping operation of the cleaner embodying structure which becomes effective to stop operation of the cleaner only when the wiper blades of the cleaner are at a predetermined parked position so that the control may be operated to stop the cleaner at any point in the cycle of the wiper blades and the latter will always come to rest at parked position.

Another object of the invention is to provide a new and improved windshield cleaner adapted to be driven from a part rotated by the engine of the vehicle in which the cleaner is installed embodying a releasable clutch, to connect and disconnect the source of power and cleaner operating mechanism, located at the source of power so that the cleaner in its entirety remains idle when the clutch is released irrespective of whether the engine of the vehicle is operating.

Another object of the invention is to provide a new and improved windshield cleaner in which parking of the wiper blades at a predetermined position is effected through the control mechanism for starting and stopping operation of the cleaner so that elaborate parking mechanism for the wiper blades is unnecessary.

A further object of the invention is to provide a new and improved windshield cleaner in which a releasable clutch is provided between the source of power which drives the cleaner and the operating mechanism of the latter which clutch is released by power supplied directly from the source through the drive means of the cleaner operating mechanism.

A still further object of the invention is to provide an improved windshield cleaner that has means for positively disconnecting the cleaner operating mechanism from its source of power.

A more specific object of the invention is to provide a new and improved windshield cleaner having a drive shaft and a clutch to connect the drive shaft to a source of power moved between engaged and disengaged positions upon opposite axial movements of the shaft along with novel mechanism for moving the shaft in a clutch disconnecting direction comprising a plurality of members movable relatively between predetermined positions of adjustment and operatively connected to be operated through a predetermined cycle upon rotation of the shaft and including a part movable axially relative to the shaft and effective at one position by relative adjustment of the members to move the shaft in a clutch disconnecting direction during the cycle of movement of the declutching members.

Another object of the invention is to provide a new and improved windshield cleaner adapted to be driven from the engine of a vehicle so constructed that the transmission of noise or vibration from the engine to the operating mechanism of the cleaner in the passenger compartment of the vehicle is minimized.

A more general object of the invention is to provide a windshield cleaner as set forth in the preceding objects which may be made primarily from inexpensive sheet metal stampings and screw machine parts, and which is easy to assemble and install, so that it may be sold and installed at relatively low cost but which nevertheless is sturdy and not subject to breakdown.

These and other objects, advantages and capabilities of the invention will become apparent from the following description wherein reference is had to the accompanying drawings, in which:

Fig. 1 is a fragmentary view, partly broken away, of a portion of an automotive vehicle equipped with a windshield showing the improved cleaner of the present invention installed on the vehicle;

Fig. 2 is a top plan view, partly in section and partly diagrammatic, of the cleaner of the present invention and the drive therefor;

Fig. 3 is an axial sectional view of the clutch used to connect the flexible drive shaft of the cleaner to a rotary source of power;

Fig. 4 is a fragmentary view, partly in section, of the operating mechanism of the cleaner of the present invention;

Fig. 5 is a rear elevational view of the operating mechanism of the windshield cleaner of the present invention showing the improved declutching mechanism at the position it assumes when the clutch controlled thereby has disconnected the cleaner operating mechanism from its source of power;

Fig. 6 is a view similar to Fig. 5 showing the front of the cleaner operating mechanism and the declutching mechanism;

Fig. 11 is a rear elevational view of a further modification of the invention showing the declutching mechanism in the position it assumes when the cleaner is connected to its source of power; and Fig. 12 is a view similar to Fig. 11 but showing the declutching mechanism in declutching position and the operating mechanism in the position assumed by it when the wiper blades are parked.

Figure 8:
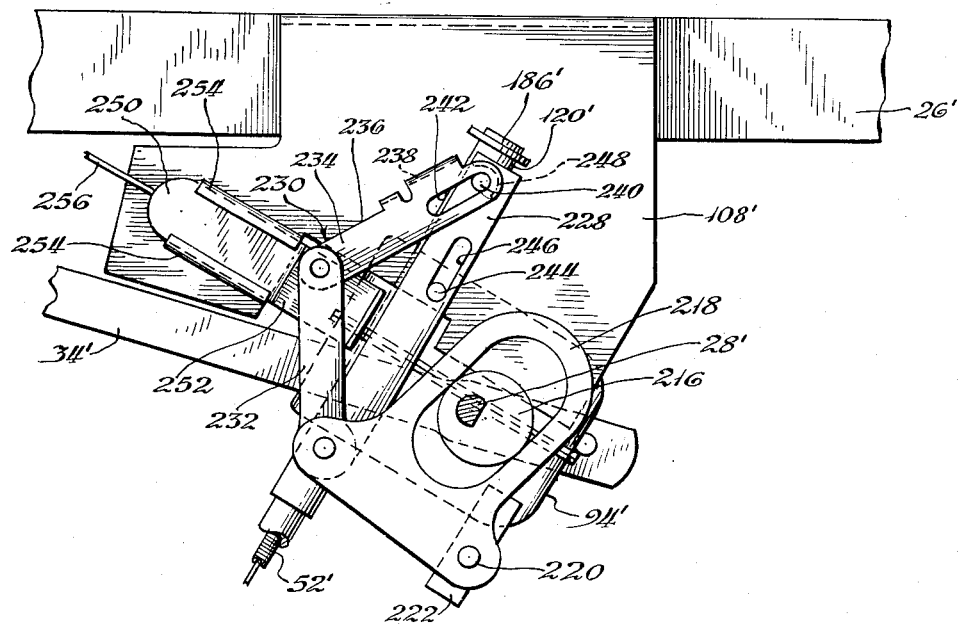
Fig. 8 is a rear elevational view of a modified declutching mechanism, showing the parts in the position assumed when the cleaner is connected to its source of power and the operating mechanism is at one limit of its stroke.

Certain of the operating mechanism of the windshield cleaner of the present invention is similar to that of the windshield cleaner disclosed in the application for patent of John Victor Stanley Dahlgren, Serial No. 71,924, now Patent 2,600,622, filed January 21, 1949. The construction and operation of those elements of the windshield cleaner of the present invention which form no part of the invention and are similar to the corresponding elements of the cleaner disclosed in the above entitled application will not be described in detail because a complete disclosure of such elements may be found in the abovementioned application.

For the purpose of illustrating the invention, the improved windshield cleaner will be described as applied to an automotive vehicle having an engine at the front and a framework supporting a cowl 20 (Fig. 1), an instrument panel (not shown except diagrammatically at 208 in Fig. 2), and a windshield 22 above these parts. The improved windshield cleaner includes operating mechanism, indicated as an entirety by the number 24, which is adapted to be secured under the cowl 20 and in front of the instrument panel of the vehicle. This operating mechanism is supported by an intermediate part of a supporting bar 26 which may be an elongated channel iron supported at its opposite ends from the framework of the automotive vehicle, in a manner to be described.

The operating mechanism includes a rotatable actuating shaft 28 (Figs. 2 and 4) having front and rear crank arms 30 and 32, respectively, fixed to the opposite ends thereof. Through a pair of oppositely extending drive links 34 the crank arms 30 and 32 rock a pair of wiper rockshafts 36 extending from the interior to the exterior of the vehicle through the cowl 20 (Fig. 1) and journaled in suitable bearings. At one end, the drive links 34 are connected to the crank arms 30 and 32 by means of suitable self lubricated crank pins 38 angularly displaced relative to each other approximately 180°, and at their other ends they are connected to crank arms 40 coupled to the wiper rockshafts 36. Thus the blades oscillate toward and from each other when the cleaner is operating. Fixed upon the outer ends of the wiper rockshafts 36 are wiper blade arms 42 (Fig. 1) which may be of conventional construction and support a pair of wiper elements 44 coupled thereto in the usual manner.

The bearings for the wiper rockshafts 36 are supported in a suitable structure including brackets 46 (Fig. 2) fixed to the inner side of the cowl 20 which includes a depending part 48 (Fig. 1). The opposite ends of the supporting bar 26 are welded or bolted to the depending portions 48 of the brackets 46 to support the cleaner in a vehicle.

Preferably a slip drive connection is provided between the crank arms 40 and the wiper rockshafts 36 so that damage to the cleaner will be avoided if the wiper blades 44 are arrested while the cleaner is operating. Suitable bearings for the wiper rockshafts 36 and structure to support the same along with a slip drive connection are disclosed in the aforementioned application for patent, Serial No. 71,924, now Patent 2,600,622, to which reference may be had for a full disclosure of the same. A universal connection suitable for connecting the drive links 34 to the rockshaft crank arms 40 is also disclosed in that application.

The operating mechanism 24 is driven from an engine accessory such as the generator shown fragmentarily at 50 (Fig. 2) by means of a flexible drive shaft 52 which is enclosed in a flexible housing 54 and which is adapted to be operatively connected with a power take-off 56 secured to one end of the housing for the generator 50. The generator 50 has a rotatable shaft 58.

The power take-off 56 includes a worm 60 coupled to the generator shaft 58. This worm drives a worm wheel 62 (Fig. 3) fixed to an output shaft 64 rotatably supported in suitable bearings 66 in the housing for the power take-off 56. Since the worm 60 is in permanent driving engagement with the generator shaft 58 and the worm wheel 62 upon output shaft 64 is in permanent driving engagement with the worm 60, output shaft 64 is rotated whenever the engine of the automotive vehicle is operating. On its outer end output shaft 64 is provided with a clutch element 68 in the form of a diametrically extending lug. This shaft thus forms the driving element of the clutch by means of which the flexible drive shaft 52 is drivingly connected to the generator shaft 58.

One end of a rigid extension 70 is fixedly secured to the lower end of the flexible shaft 52, and to the other end of the rigid extension 70 a driven clutch element 72 is secured by means of a shear pin 74. The free end of the driven element 72 is formed to receive the lug 68 on the output shaft 64 to form a driving connection between these two parts. They are supported for rotational and axial movement in aligned relation in a bore 76 centered in the body of the power take-off 56.

The axially movable driven clutch element 72 is urged to engaged position by a coil spring 78 (Fig. 3) surrounding the extension 70 and housed in a sleeve or ferrule 80 which is attached at one end to the lower end of the housing 54 for the flexible drive shaft 52. On its opposite end the ferrule 80 has an outwardly extending flange 82 held between a pair of resilient washers 84 compressed against the upper end of the power take-off 56 by means of a cap 86 threaded on the outer end of the power take-off. A fluid-tight seal is thus provided at this union which prevents escape of the lubricant normally packed in the flexible shaft housing during the assembly of these parts. These resilient washers also serve to reduce materially the transmission of generator and engine noises along the flexible shaft housing 54 to the interior of the passenger compartment in the vehicle.

The spring 78 reacts between a shoulder 88 adjacent the upper end of the ferrule 80 and a washer 90 of a suitable antifriction and thrust bearing 92 received upon the extension 70 and abutting against the upper end of the driven clutch element 72. The spring 78 is under constant compression and exerts sufficient thrust upon the flexible drive shaft 52 to move the same axially in a direction to bring the driving and driven clutch elements 68 and 72 into operative engagement when the declutching mechanism, which is to be described, is in inoperative position.

When the clutch elements 68 and 72 are in engaged position, the flexible shaft 52 drives the operating mechanism 24 through a gear train enclosed in a stamped sheet metal housing or gear box 94 (Figs. 2 and 4). This gear box includes complementary upper and lower sections 96 secured together by riveting or welding along their confronting flanged edges 98. An aperture is provided in the upper wall of the gear box 94 having a spherically rounded flange 100 (Fig. 4), and aligned with this flanged aperture is an aperture 102 in the lower wall of the gear box. The upper end of the flexible drive shaft housing 54 is secured to the bottom wall of the gear box 94 by means of a ferrule 104 having a peripheral flange 106 at one end which engages the inner periphery of the aperture 102 in the bottom wall of the gear box to fix the ferrule relative to the gear box. At its opposite end the ferrule is fixedly secured to the upper end of the flexible housing 54 by any suitable means.

The gear box and the balance of the operating mechanism of the cleaner are supported from the supporting bar 26 by means of a generally U-shaped supporting bracket 108 (Figs. 2 and 4) having a front wall or flange 110 and a rear wall or flange 112. The front wall 110 of this bracket is secured along its upper edge to the back of the supporting bar 26 by a pair of lock screws 114 (Fig. 6). Along their lower ends the walls 110 and 112 on the supporting bracket embrace the sides of the upper half of the gear box 94 and the latter is secured thereto by any suitable means such as spot welding.

The front and rear walls of the gear box have aligned apertures (not shown) which are provided with flanges for supporting a pair of bearings (not shown) in which the actuating shaft 28 rotates. Fixed to the portion of the actuating shaft 28 within the gear box 94 is a worm wheel 116 (Fig. 4) which forms a part of the gear train of the wiper operating mechanism. The manner in which this shaft is mounted has not been shown in detail because it may be similar to the corresponding shaft of the windshield cleaner disclosed in the aforementioned application for patent.

The worm wheel 116 is driven by a hollow worm 118 having reduced axial extensions 120 and 122, respectively, on opposite ends thereof journaled in similar upper and lower self-aligning bearings 124 and 126, respectively. Lower bearing 126 is supported in the enlarged upper end of the ferrule 104, while the upper bearing 124 is held for limited movement in the flange 100 around the aperture in the upper wall of the gear box 94.

A driving connection between the flexible shaft 52 and worm 118 is established through a rigid extension shaft 128 (Fig. 4), crimped upon the upper end of the flexible shaft 52. This extension is freely slidable longitudinally in an axial bore in the worm 118, and it has a radially projecting key or spline 130 adjacent its upper end which engages in an elongated axially extending slot 132 in the upper extension 120 on the worm. Since the shaft fits loosely in the hollow worm, these two parts may be moved relatively in an axial direction but the spline 130 forms a driving connection between the shaft and worm in all relative axial positions thereof.

In the operation of the cleaner the worm 118 drives the worm wheel 116 in a counterclockwise direction, as seen in Fig. 4. As a result, an axial thrust is imparted to the worm 118 in an upward direction. To minimize friction due to this thrust, an antifriction thrust bearing 134 is interposed between the inner end of upper bearing 124 and a shoulder 136 at the base of the reduced upper extension 120 on the worm. Axial play of the worm 118 relative to the gear box 94 is limited by metal washers or shims 138 secured on the lower reduced end 122 of the worm between the inner end of the lower bearing 126 and a shoulder 140 formed at the base of this reduced end.

Preferably the bearings 124 and 126 in which the worm 118 rotates, and the bearings in which the actuating shaft 28 rotates are made from an oil impregnated sintered powdered metal, known commercially as "Oilite" which may be a bronze or a ferrous base alloy. The lower worm bearing 126 is supplied with oil by an oil soaked felt washer 142 surrounding this bearing and held in position by the shims 138 and the flange 106 on the ferrule 104. The upper worm bearing 124 is supplied with oil by an oil soaked felt washer 144 similar to washer 142 and held in position by a bearing retainer 146. Suitable oil soaked felt washers may be provided for supplying oil to the bearings in which the actuating shaft 28 rotates, as described in the aforementioned application for patent.

Since the spline 130 on the upper end of the drive shaft 52 is engaged at all times in the slot 132 in the extension 120 on the worm 118, the latter will be driven whenever the driving and driven clutch elements 68 and 72, respectively, are in engaged position while the engine of the vehicle is operating and will drive the actuating shaft 28 and the cranks 30 and 32, thereby operating the wiper blades 44. This driving connection may be disconnected by the novel declutching mechanism now to be described.

In the preferred form of the invention disclosed in Figs. 1–7, the declutching mechanism comprises duplicate linkage on the front and back of the cleaner operating mechanism 24 which is continuously operated through a predetermined stroke or cycle while the cleaner is operating by duplicate cam means. This cam means includes rotatable cams 148 (Figs. 4–6) fixed on the actuating shaft 28, and duplicate rockable cam members 150 (Fig. 5) carried upon the oppositely projecting ends of a shaft 152 supported in the supporting bracket 108. The rotatable cams 148 are fixed on the actuating shaft 28 between the inner sides of the crank arms 30 and 32, on the outer ends of this shaft, and duplicate discs one of which is shown at 154 (Fig. 4) which cooperate with the inner sides of the crank arms to form guides for the rockable cams 150. Spacers 156 (Fig. 2) on the shaft 152 between the rockable cams 150 and the walls or flanges on the supporting bracket 108 maintain the rockable cams 150 in alignment with the rotatable cams 148.

Figure 7:
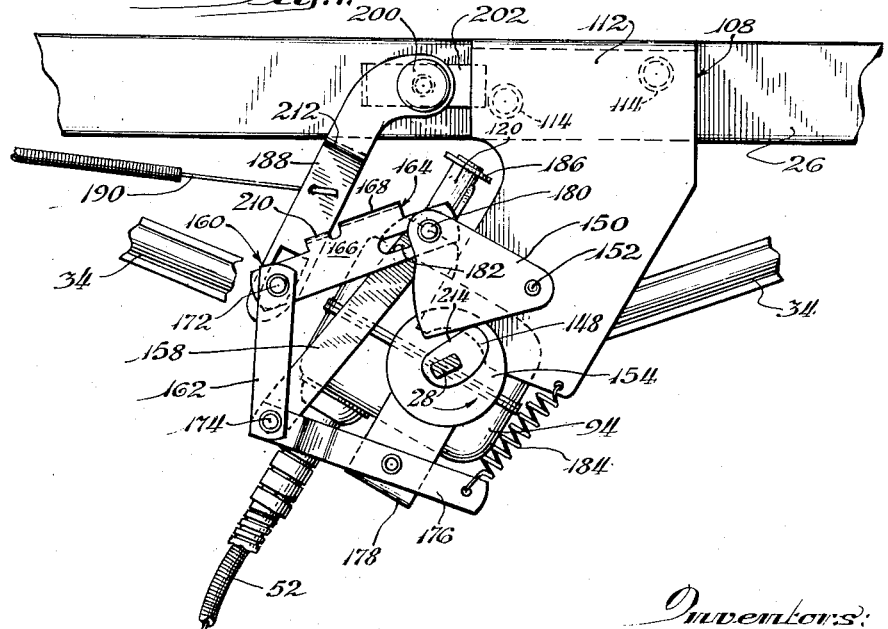
Fig. 7 is a view similar to Fig. 5 showing the declutching mechanism in the position it assumes when the cleaner operating mechanism is connected to its source of power and the cleaner is operating.

Referring to Figs. 6 and 7, it will be seen that the duplicate linkage on each side of the cleaner operating mechanism comprises an elongated link 158 and a toggle 160 which, in extended position, is of greater end-to-end length than the elongated link 158. The two toggles 160 comprise duplicate links 162 and a generally channel-shaped member 164 having elongated sides 166 interconnected by a web 168 (Fig. 2). These elongated sides form the second links for the toggles 160. Fixed stop fingers 170 are provided at the upper end of the toggle member 164 and may be formed as indicated by bending the terminal portions of the elongated sides 166 on this end of the toggle member 164 toward each other, these terminals also being transversely rounded.

Adjacent their opposite or lower ends, the elongated sides 166 of toggle member 164 are each connected to one end of a duplicate links 162 by pins 172 which form the intermediate pivots of the toggles 160. The lower ends of the toggles 160 and elongated links 158 are interconnected by pins 174 which also extend through the free ends of a pair of duplicate rocker arms 176 rockably secured intermediate their ends upon a bracket 178 depending from the lower side of the gear box 94. Adjacent their upper ends the two elongated links 158 are connected to the opposite rockable cam members 150 by pins 180 which extend through elongated slots 182 in the opposite elongated sides 166 of the toggle member 164. These slots are of sufficient length so that the toggles 160 may be moved between extended and retracted positions relative to the elongated links 158.

All of these parts, namely, the rockable cams 150, elongated links 158, toggles 160, and rocker arms 176 are biased by tension springs 184 connected to the free ends of the rocker arms 176 and the lower edges of the flanges or walls of the supporting bracket 108 so that the cam faces on the rockable cams 150 are held in firm engagement with the peripheral edge of the rotatable cams 148 at all times. It will be observed, in Fig. 2, that the inwardly bent fingers 170 on the upper end of the toggle member 164 lie on each side of the extension 120 on worm 118 below a stop or abutment 186 fixed on the upper end of the flexible shaft 52.

Inasmuch as the opposite ends of the toggles 160 are connected to the elongated links 158 and the latter are reciprocated generally axially of the worm 118 and the upper end of the shaft 52 by the rockable cams 150 and biased rockers 176 when the cleaner is operating, reciprocatory movement generally axially of the worm 118 and flexible shaft 52 is imparted to the toggles 160 and the inturned fingers 170 on the upper ends thereof. When the toggles 160 are in retracted position (Fig. 7), the stroke imparted thereto is not sufficient to bring the inturned fingers 170 into operative engagement with the stop 186 on the upper end of the flexible shaft 52. However, upon movement of the toggles 160 to extended position (Figs. 5 and 6), the inturned fingers 170 are moved axially of the shaft 52 toward the stop 186 thereon, thereby increasing the effective length of the linkage. Thereupon at a predetermined point in the rotation of the rotatable cams 148, the fingers 170 on the toggles 160 are brought into operative engagement with the stop 186 and the flexible shaft 52 is moved axially against the restraint afforded by friction and the spring 78 (Fig. 3) a distance sufficient to disengage the driven clutch element 72 from the driving clutch element 68. As a result, the drive to the operating mechanism through worm 118 is discontinued and the frictional restraint between the wiper blades 44 and windshield arrests operation of the cleaner substantially instantaneously.

To eliminate the need for special parking mechanism for the wiper blades 44, the rotatable cams 148 are arranged to effect disconnection of the drive to the operating mechanism 24 when the wiper blades 44 are at or in close proximity to one limit of their stroke and preferably the outermost limit of this stroke as indicated in full lines in Fig. 1.

Movement of the toggles 160 between extended and retracted position is effected by a lever 188 (Fig. 6) operated by a Bowden wire 190. Lever 188 is pivotally secured at one end upon a suitable pin 200 (Fig. 5) fixed in the supporting bar 26 and is frictionally restrained by suitable means such as a bowed leaf spring 202 on the pin 200 between the bar and lever. A lost motion connection between the lower end of the lever 188 and the toggles 160 is provided by an elongated generally triangular shaped aperture 204 (Fig. 6) in the lower end of the lever into which projects the outer end of the pin 172 forming the intermediate pivot of the front toggle 160. By virtue of this connection between the lever 188 and toggles 160, the linkage is free to reciprocate through a limited stroke in a generally vertical direction without interference from the lever.

One end of the Bowden wire 190 is fixedly secured to the lever 188 as indicated while the other end is fixed to a manually operable control knob 206 (Fig. 2) reciprocably mounted in any suitable manner on the instrument panel 208 of the vehicle. In Figs. 5 and 6 the toggles 160 are shown in extended position and the lever 188 is at the limit of its movement in a clockwise direction while the knob 206 (Fig. 2) has been pushed inwardly to the limit of its movement in that direction. It is to be noted that the toggles 160 are slightly beyond dead center. Movement of the toggles in this direction is limited by a pair of inwardly projecting lugs on the toggle member 164, one of which is shown at 210 (Fig. 2). These lugs engage the outwardly facing edges of the elongated links 158 as the toggle passes dead center. As a result, the toggles will remain locked in extended position until the hand knob 206 is pulled outwardly to the dotted line position shown in Fig. 2.

When this occurs, the lever 188 is rocked counterclockwise (Fig. 6), thus moving the toggles 160 to the retracted position shown in Fig. 7. During this movement of the toggles, the inwardly extending stop fingers 170 on the upper ends thereof are moved generally axially downwardly relative to the upper end of the worm 118 and flexible shaft 52, thus releasing the latter. Thereupon the spring 78 moves the flexible shaft axially downwardly until the driving and driven clutch elements 68 and 72, respectively, are brought into operative engagement so that the cleaner operating mechanism 24 and wiper blades 44 will commence operating, provided the engine of the automotive vehicle is operating. Movement of the lever 188 in a direction to retract the toggle 160 is arrested when an offset 212 intermediate the ends of the lever engages the supporting bar 26, as shown in Fig. 7.

As previously explained, the rotatable cams 148 are arranged to cause the declutching mechanism to be actuated when the wiper blades 44 are at or very close to the outermost limit of their stroke. In order to avoid chipping of the interengaging elements on the driving and driven clutch members 68 and 72, respectively, it is desirable to effect declutching with a snap action. For this reason the rotatable cams 148 have a relatively abrupt rise 214 on their leading edges.

In the two modifications of the invention disclosed in Figs. 8–12, a modified declutching means is provided, but in other respects the cleaners disclosed in these views are substantially the same in construction and operation as the cleaner just described. These cleaners, therefore, will not be described in detail, and the parts which are of the same construction as the corresponding parts of the cleaner previously described will be given the same reference numbers primed.

Referring to these views, it will be noted that the modified windshield cleaners disclosed therein each comprise an operating mechanism including an actuating shaft 28' rotatably supported in a gear box 94' which is carried by a supporting bracket 108' depending from an elongated horizontally extending supporting bar 26'. Gearing for driving the actuating shaft 28' from a rotatable and axially movable flexible shaft 52' is housed in the gear box 94'. This gearing includes a worm having an extension 120' projecting from the upper side of the gear box 94'. The flexible shaft 52' which has a splined connection with the extension 120' on the worm is adapted to be drivingly connected to a rotatable shaft of an engine accessory by a clutch of the type previously described, and the flexible shaft 52' has a fixed stop or abutment 186' on its upper end.

Fixed adjacent the opposite ends of the actuating shaft is a pair of crank arms similar to the crank arms 30 and 32 previously described. These crank arms are connected by means of a pair of drive links to the rock shafts for the two wiper operating arms of the windshield cleaner. A fragment of one of these drive links is indicated by the number 34'. The parts of the modified cleaners thus far described may be of substantially the same construction as the corresponding parts of the cleaner previously described and operate in the same manner.

Figure 10:
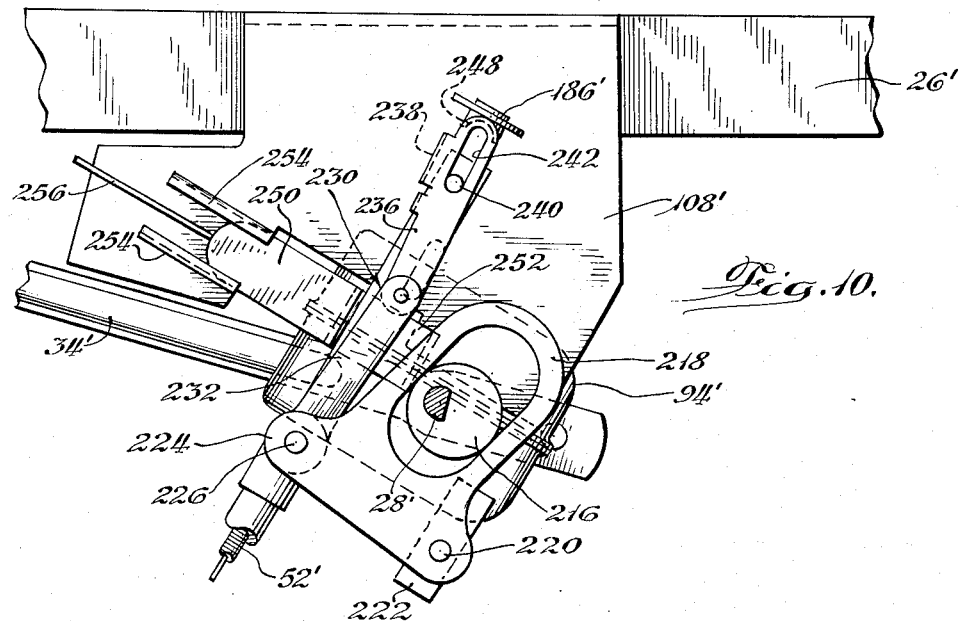
Fig. 10 is a view similar to Fig. 8 but showing the declutching mechanism in declutching position and the operating mechanism in the position assumed by it when the wiper blades are parked.
Figure 9:
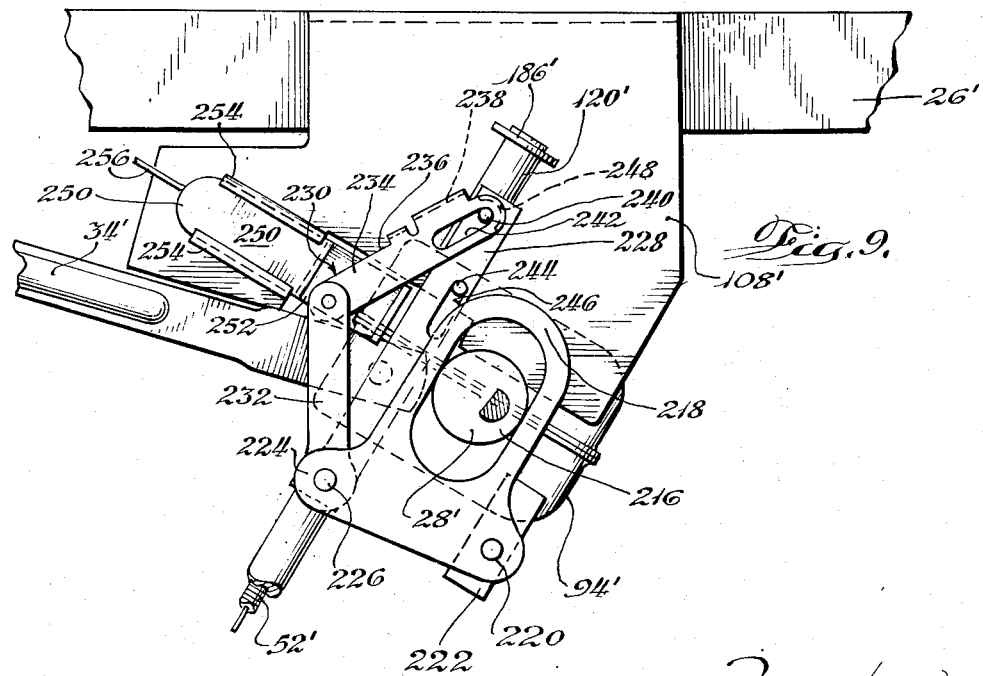
Fig. 9 is a view similar to Fig. 8 but showing the cleaner operating mechanism at the other limit of its stroke.

The declutching mechanism of the modification shown in Figs. 8–10 includes linkage which may be duplicated on opposite sides of the cleaner. This linkage is operated by cam means including duplicate eccentrics mounted adjacent opposite ends of the actuating shaft 28' in a manner similar to the manner in which the rotatable cams 148 previously described are mounted. One of these eccentrics is indicated at 216 and this eccentric operates a rockable cam member 218 having an arm rockably secured at 220 upon a bracket 222 depending from the lower end of the gear box 94' and a second arm 224 to which one end of the declutching linkage is pivotally secured by a pin or rivet 226. By virtue of the contour of the cooperating cam surface on the eccentric 216 and rockable cam 218, the latter is oscillated upon its axis 220 between the two extreme positions indicated in Figs. 8 and 9 and thus oscillates the arm 224 and pin 226 connecting the linkage thereto through an arc extending substantially axially relative to the flexible shaft 52'.

The declutching linkage on each side of the cleaner includes an elongated link 228 and a toggle 230 including two links 232 and 234. The latter link may be part of a toggle member 236 similar in construction to the toggle member 164 previously described having opposite elongated sides each of which forms one link 234. A web 238 connects the two links 234 in the toggle member 236. At their lower ends the opposite elongated links 228 and the opposite toggle links 232 are interconnected by the opposite pins 226 previously mentioned connecting the lower end of the linkage to the rockable cams 218 while the upper ends of the link forming sides 234 of toggle member 236 are interconnected with the upper ends of the opposite elongated links 228 by means of a pair of pins, one of which is shown at 240. The opposite pins 240 engage in slots 242 in the opposite link forming sides 234 of the toggle member 236. These slots are of sufficient length to permit movement of the toggles 230 between extended and retracted position relative to the elongated links 228.

By virtue of this interconnection of the elongated links 228 and the toggles 230 those parts reciprocate in unison. The elongated links 228 are constrained for reciprocatory movement substantially axially of the worm extension 120' and upper end of the flexible shaft 52' by outwardly projecting pins, the back one of which is shown at 244. These pins project in opposite directions from the supporting bracket 108' into elongated slots in the opposite elongated links 228, the slot in the back link being indicated at 246. At its upper end the toggle member 236 is provided with transversely rounded inturned fingers 248 similar to the fingers 170 previously described which lie on opposite sides of extension 120' and which are moved substantially axially of the extension when the declutching linkage is reciprocated toward and from the abutment or stop 186' on the upper end of the flexible shaft 52'.

The elongated links 228 on opposite sides of the cleaner are reciprocated toward and from the stop 186' on the flexible shaft 52' when the cleaner is operating but are not of sufficient length to engage this stop nor are the stop fingers 248 carried into engagement with this stop when the toggles 230 are in retracted position. However, when the toggles 230 are moved to extended position, the stop fingers 248 are moved axially toward the stop 186' thereby increasing the effective length of the declutching linkage sufficiently so that the fingers 248 will be brought into operative engagement with the stop 186' during the cycle of movement of the linkage and will cause the flexible drive shaft 52' to be raised the distance necessary to break the driving connection between the driving and driven elements of the clutch connecting the flexible shaft 52' to the source of power. Operation of the cleaner is thus discontinued in the manner described for the previous embodiment of the invention.

The toggles 230 are moved between extended and retracted positions by a slide 250 having a channel-shaped end 252 surrounding the intermediate part of the back toggle 230 as indicated in Fig. 9. This slide is reciprocated in a pair of slide forming lugs 254 struck up from the back wall of the supporting bracket 108'. It is reciprocated by a Bowden wire 256 which may be operated by means of a control knob (not shown) on the instrument panel of the vehicle similar to the control knob 206 previously described. Because the linkage on opposite sides of the cleaner is interconnected by the web 238 of toggle member 236, movement of this control knob inwardly and outwardly moves both toggles between retracted and extended positions in the same manner as the toggles 160 are moved by the lever 188 and Bowden wire 190.

The effect of this movement of the toggles 230 on the operation of the cleaner is the same as described for the preferred embodiment of the invention, and, since that was set forth in detail, a repetition thereof is thought to be unnecessary especially in view of the fact that the operation of this modification should be apparent from Figs. 8–10. Figs. 8 and 9 show the declutching linkage at the position it assumes while the cleaner is operating, Fig. 8 showing the linkage at the highest point in its stroke, and Fig. 9 showing it at the lowest point in its stroke. Fig. 10 shows the toggles 230 in extended position and the linkage at the highest point in its stroke. The fingers 248 on the toggle member 236 have, therefore, engaged the stop 186' on the flexible drive shaft 52' and have caused the latter to be moved axially sufficiently to disengage the clutch.

Another form of declutching mechanism is shown in Figs. 11 and 12, and, like the previous embodiments of the invention, this mechanism may be duplicated on opposite sides of the cleaner. This declutching mechanism is operated by cam means including duplicate eccentrics, one of which is shown at 258. These eccentrics are mounted adjacent opposite ends of the actuating shaft 28' in a manner similar to the rotatable cams 148 first described. The eccentrics 258 operate duplicate front and rear cam members, one of which is shown at 260 rockably secured upon a pin 262 which is carried in one end of a generally triangular shaped rocker 264 fixed upon a shaft 266 extending across the supporting bracket 108' and rockable relative thereto. A duplicate rocker is fixed on the other end of shaft 266 from that shown and has a pin secured thereto similar to pin 262 upon which the second rockable cam is secured. Since the rocker 264 and its duplicate are both fixed upon shaft 266, they will rock in unison.

The rockers 264 are rocked between the position shown in Fig. 11 and the position shown in Fig. 12 by a Bowden wire 268 connected at one end to one of these rockers on the opposite side of its pivot axis 266 from that at which the pin 262 for the cam 260 is secured. The opposite end of the Bowden wire is connected to a control knob (not shown) which may be mounted upon the instrument panel of the vehicle in the same manner as the control knob used in the first modification of the invention. When the control knob is pulled out, the duplicate rockers 264 are rocked to the position shown in Fig. 11. When the rockers are in this position eccentrics 258 rock cams 264 between the positions shown in full and dotted lines in Fig. 11. The cams 260 each have an operating finger, that on the cam shown being numbered 270, and these operating fingers are rocked substantially axially of the worm extension 120' toward and from the stop 186' on the flexible shaft 52', but are not brought in operative engagement with the stop 186' when the cams 260 rock between the position shown in Fig. 11.

When the control knob is moved to its innermost position, thus extending the Bowden wire 268 and rocking the shaft 266 and the duplicate rockers 264 in a counterclockwise direction (Fig. 12), the pivot axis 262 for the duplicate rockable cams 260 is moved upwardly relative to the worm extension 120' and the upper end of the flexible shaft 52' to the position shown in Fig. 12. As a result, the rocking axis 262 of the rockable cams 260 is moved into closer proximity to the stop 186' on the flexible shaft 52' but the cams 260 are rocked through substantially the same cycle as previously described when the cleaner is operating as shown in full and dotted lines in Fig. 12. At the lowermost point in their stroke, shown in dotted lines in Fig. 12, the operating fingers 270 on the duplicate cams 260 are in close proximity to the stop 186' on the flexible shaft 52'. As the eccentrics 258 move to the position shown in full lines in Fig. 12, cams 260 will be rocked in a counterclockwise direction upon their axes 262 from the dotted line position to the full line position shown in Fig. 12, the operating fingers moving substantially axially of the worm extension 120'.

While the operating fingers 270 are at the lowermost portion of their cycle, they engage behind the stop 186' on flexible shaft 52' as indicated in dotted lines in Fig. 12. During the course of their movement to the full line position shown in Fig. 12, the operating fingers 270 draw the flexible shaft 52' upwardly a sufficient distance to move the driven clutch element on the lower end of this shaft out of driving engagement with the driving clutch element in the same manner as described for the first embodiment of the invention.

In all modifications of the invention the cams or eccentrics driven by the actuating shaft of the cleaner are so arranged that the drive to the operating mechanism of the cleaner is discontinued when the wiper blades are at or in close proximity to the outermost limit of their stroke. The wiper blades are thus at parked position and the frictional restraint between the blades and windshield normally is sufficient to stop the blades almost instantaneously. Thus parking of the wiper blades at a predetermined position is effected without the need for elaborate parking mechanism. Furthermore, the control for starting and stopping operation of the cleaner may be operated to stop the cleaner at any point in the cycle of the wiper blades and they will always come to rest at the same predetermined position. Adjustment of the point in the cycle of the wiper blades at which the drive to the cleaner is discontinued can readily be made by adjusting the cams or eccentrics on the actuating shaft.

In order to produce disengagement of the driving and driven elements of the clutch, the cams 148 and the eccentrics 216 and 258 of the three modifications of the invention are so arranged that movement of the linkage or cams operated thereby in a clutch disengaging direction occurs abruptly and rapidly so that the clutch is disengaged with a snap action. This minimizes the likelihood of chipping of the clutch elements 68 and 72.

It is also to be understood that while these elements are in driving engagement the frictional restraint between them tends to lock them against separation and the force applied to the flexible shaft 52 to separate the clutch elements tends first to elongate the shaft. However, once the clutch elements start to separate the frictional restraint between them is greatly reduced. For this reason, once separation starts it occurs with a snap action, since the movement imparted to the movable clutch element by the flexible shaft is due in part to the rapidly acting declutching mechanism and in part to the contraction of the shaft to its normal length. By disconnecting the drive means for the cleaner at the source of power, wear on the cleaner operating mechanism is reduced and the noise which might be made by the drive shaft of the cleaner is avoided when the cleaner is not in use.

Reduction in the cost of manufacture of the windshield cleaner of the present invention as compared to prior cleaners is possible due to the fact that most of the parts thereof are of standard construction or of simple form so that they may be stamped from sheet metal. Furthermore, the simplified mounting of the cleaner in a vehicle simplifies installation of the same upon the vehicle.

Inasmuch as the declutching mechanism is duplicated on the opposite sides of the cleaner, the same forces are applied to the opposite ends of the actuating shaft and operating mechanism. Unbalance, therefore, is less likely to develop in the operating mechanism. However, it is to be understood that a declutching mechanism operating from one side of the cleaner operating mechanism could be provided by making slight modifications in the structure disclosed herein.

While preferred embodiments of the invention have been shown and described, it will be apparent that numerous variations and modifications thereof may be made without departing from the underlying principles of the invention. It is desired, therefore, by the following claims to include within the scope of the invention all such variations and modifications by which substantially the results of the invention may be obtained through the use of substantially the same or equivalent means.

We claim:

1. A driven shaft shifting mechanism for shifting a rotatable shaft in one endwise direction to disengage a remote clutch, said shaft being resiliently urged in the opposite direction to engage said clutch, comprising eccentric means driven at a reduced speed by said driven shaft, a member on said driven shaft movable in an endwise direction with said driven shaft, linking means driven by said eccentric to reciprocate cyclically toward and away from said member with each revolution of said eccentric whenever said driven shaft is rotated, and manually actuated means to change the length of said linking means so that said linking means impinges against said member when next reciprocated toward said member and urges said member and driven shaft in said one direction.

2. A device as called for a claim 1 in which said linking means consists of an over-center toggle mechanism and in which said manually actuated means is connected to said toggle so as to extend said toggle and increase its length when in one position and to collapse said toggle to decrease its length when in another position.

3. A driven shaft shifting mechanism for shifting a rotatable shaft in one endwise direction to disengage a remote clutch, said shaft being resiliently urged in the opposite direction to engage said clutch, comprising eccentric means driven by said driven shaft at a reduced speed, a member on said driven shaft movable in an endwise direction with said driven shaft, reciprocating means driven by said eccentric to reciprocate cyclically toward and away from said member with each revolution of said eccentric whenever said driven shaft is rotated, and manually actuated means to communicate movement from said reciprocating means to said member when said reciprocating means next is reciprocated toward said member.

4. A driven shaft shifting mechanism for shifting a rotatable shaft in one endwise direction to disengage a remote clutch, said shaft being resiliently urged in the opposite direction to engage said clutch, comprising eccentric means driven by said driven shaft at a reduced speed, a member on said driven shaft movable in an endwise direction with said driven shaft, linking means driven by said eccentric to reciprocate cyclically toward and away from said member with each revolution of said eccentric whenever said driven shaft is rotated, and manually actuated means to shift the position of said linking means so that said linking means impinges against said member when next reciprocated toward said member and urges said member and driven shaft in said one direction.

WILLIAM R. BELL.
EDWIN C. McRAE.

References Cited in the file of this patent

UNITED STATES PATENTS

| Number | Name | Date |
|---|---|---|
| 2,079,573 | Laur | May 4, 1937 |
| 2,121,233 | Horton | June 21, 1938 |
| 2,129,619 | Horton | Sept. 6, 1938 |
| 2,223,660 | Horton | Dec. 3, 1940 |
| 2,280,246 | McCullough | Apr. 21, 1942 |
| 2,515,606 | Linder | July 18, 1950 |